March 29, 1949.  H. G. MILLER ET AL  2,465,693
LATERAL MOTION CUSHIONING DEVICE
Filed Sept. 28, 1945  3 Sheets-Sheet 1

Inventors
Harry G. Miller
Oscar C. Peterson
BY Mann and Brown
Attorneys.

March 29, 1949.　　H. G. MILLER ET AL　　2,465,693
LATERAL MOTION CUSHIONING DEVICE
Filed Sept. 28, 1945　　　　　　　　　　　3 Sheets-Sheet 2
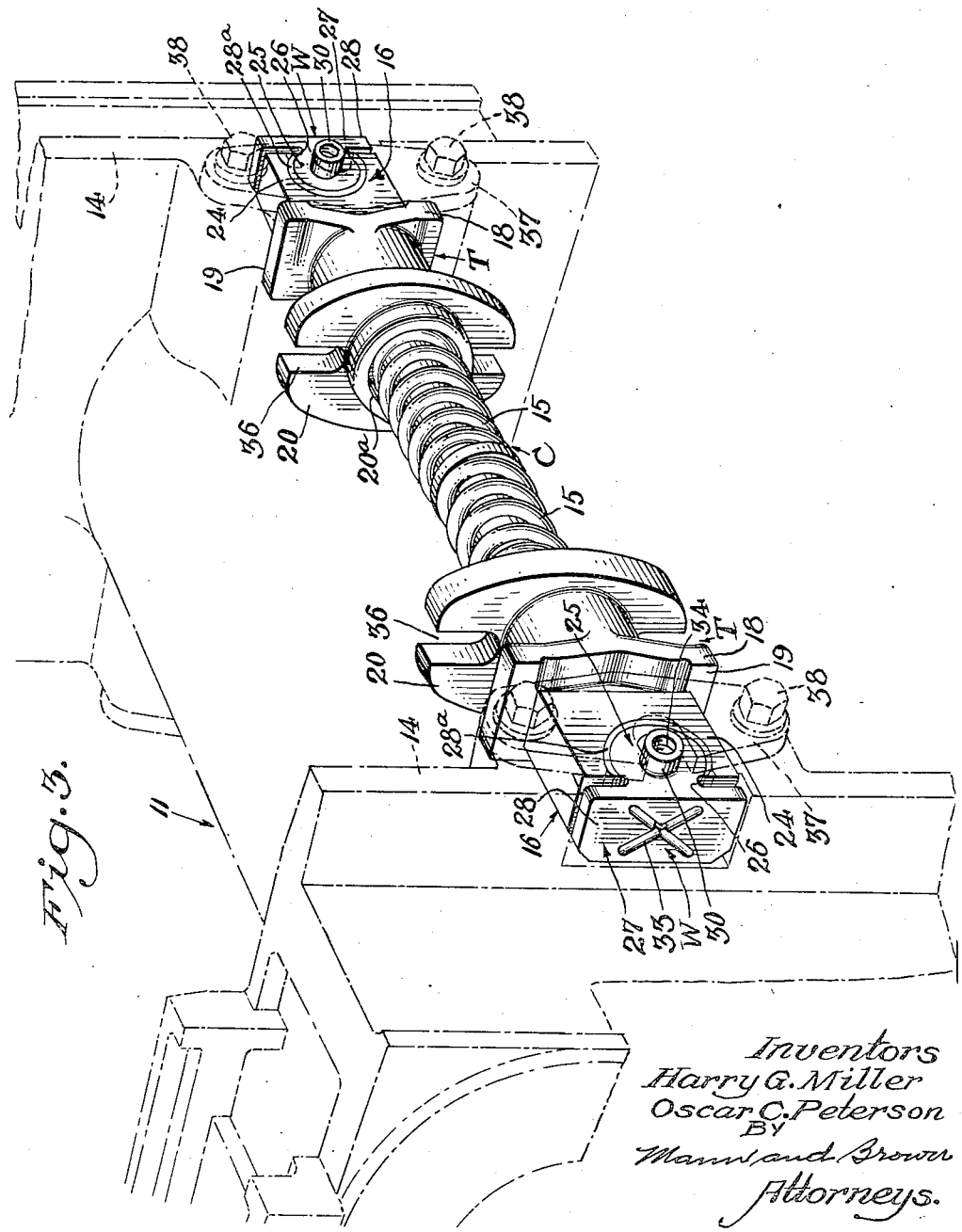
Inventors
Harry G. Miller
Oscar C. Peterson
BY
Mann and Brown
Attorneys.

March 29, 1949. H. G. MILLER ET AL 2,465,693
LATERAL MOTION CUSHIONING DEVICE
Filed Sept. 28, 1945 3 Sheets-Sheet 3
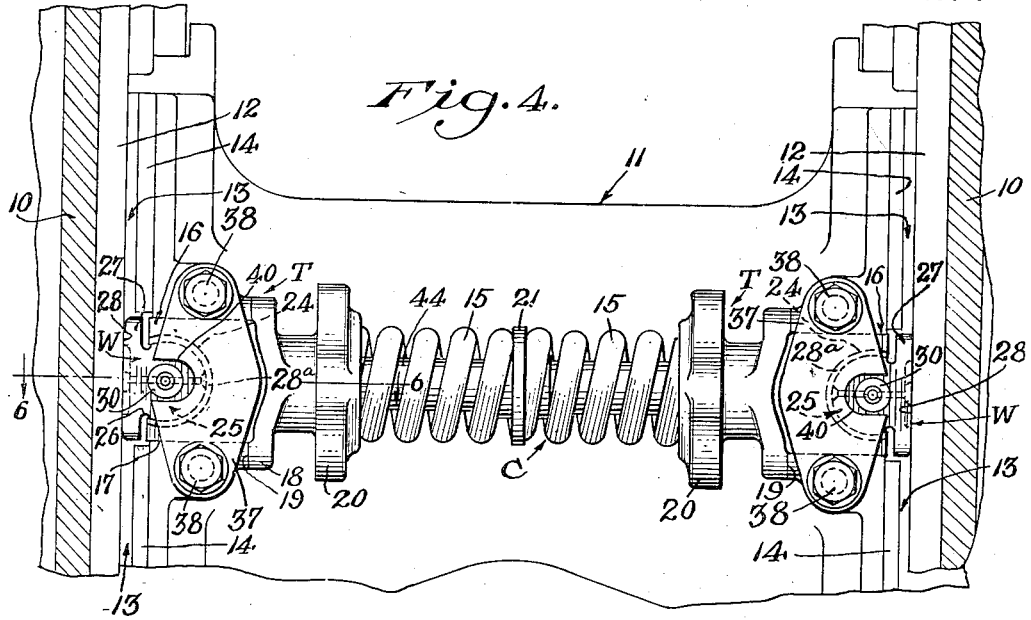
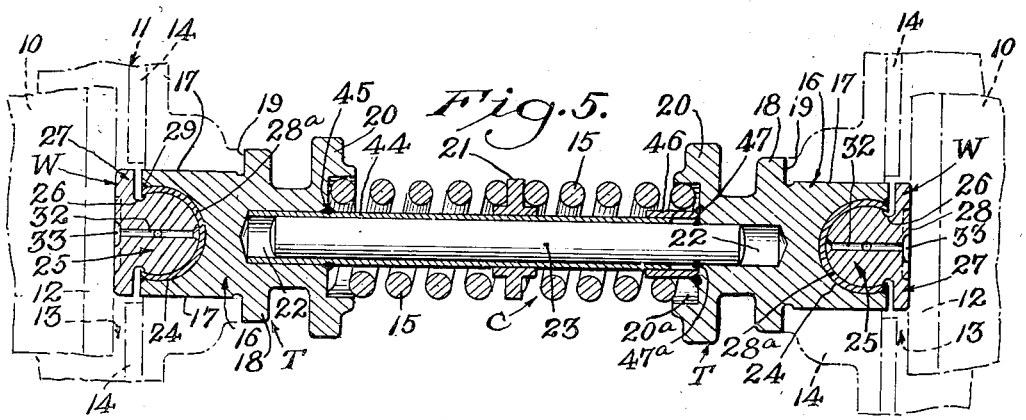
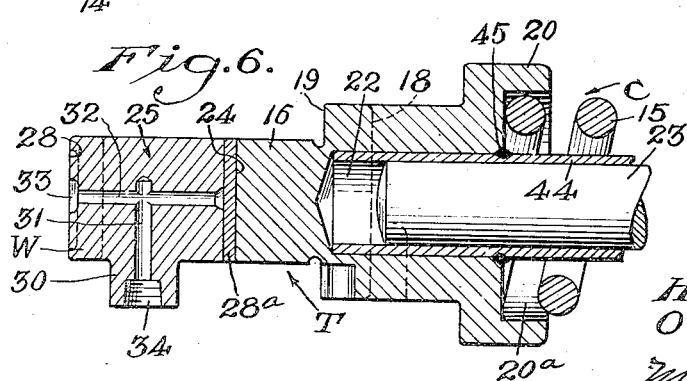
Inventors
Harry G. Miller
Oscar C. Peterson
BY
Mann and Brown
Attorneys;

Patented Mar. 29, 1949

2,465,693

UNITED STATES PATENT OFFICE 2,465,693

LATERAL MOTION CUSHIONING DEVICE

Harry G. Miller and Oscar C. Peterson,
West Allis, Wis.

Application September 28, 1945, Serial No. 619,150

5 Claims. (Cl. 105—80)

The driving wheels of a locomotive are aligned along the rails on straight track, but as each pair of driving wheels goes on a curve they are necessarily deflected from the straight line of travel and are actually moved laterally with respect to that line as they take tangential positions on the curved rails. As they leave a curve and enter on straight track again, the movement is reversed. Unavoidably, there must be endwise movement of each axle relative to the locomotive frame during these happenings. That movement has come to be known as "lateral motion" or "lateral." It is caused by pressure between the tire flanges and the outside rail as the locomotive enters and travels along a curve and pressure between the tire flanges and the inside rail as the locomotive leaves a curve and enters on straight track. Cushioning that movement softens the grinding pressure between the tire flanges and the rail, relieves lateral stresses in locomotive and track, and improves the riding qualities.

Prior lateral motion cushioning devices—for examples, Blunt No. 1,946,893, February 13, 1934, No. 2,047,666, July 14, 1936, and Locomotive Cyclopedia, 1938, page 666—have been short lived due to excessive wear on the thrust members because they did not rightly adjust to the relative rocking movement of the wheel axles and the frame. There were other causes, but that one is outstanding.

The principal object of this invention is to reduce the excessive wear and to make restoration for wear cheap and easy. Generally speaking, this is accomplished by providing each thrust member with a swinging wear shoe that will automatically accommodate the rocking movements and that can be quickly replaced by a new shoe when needed. Other objects and advantages of the invention will appear as the disclosure proceeds and the description is read in connection with the accompanying drawings illustrating a preferred embodiment of the invention, and in which—

Fig. 3 is a perspective view of one of the lateral motion cushioning devices and the associated roller bearing housing or axle journal box displaced from the other parts;

Fig. 4 is a front elevation of the lateral motion cushioning device on a background of associated parts of the roller bearing housing or axle journal, the frame, etc.;

Fig. 5 is a vertical section along the axis of the lateral motion cushioning device shown in Fig. 4; and Fig. 6 is a horizontal section along the axis of that device as indicated by the line 6—6 of Fig. 4.

Figure 1:
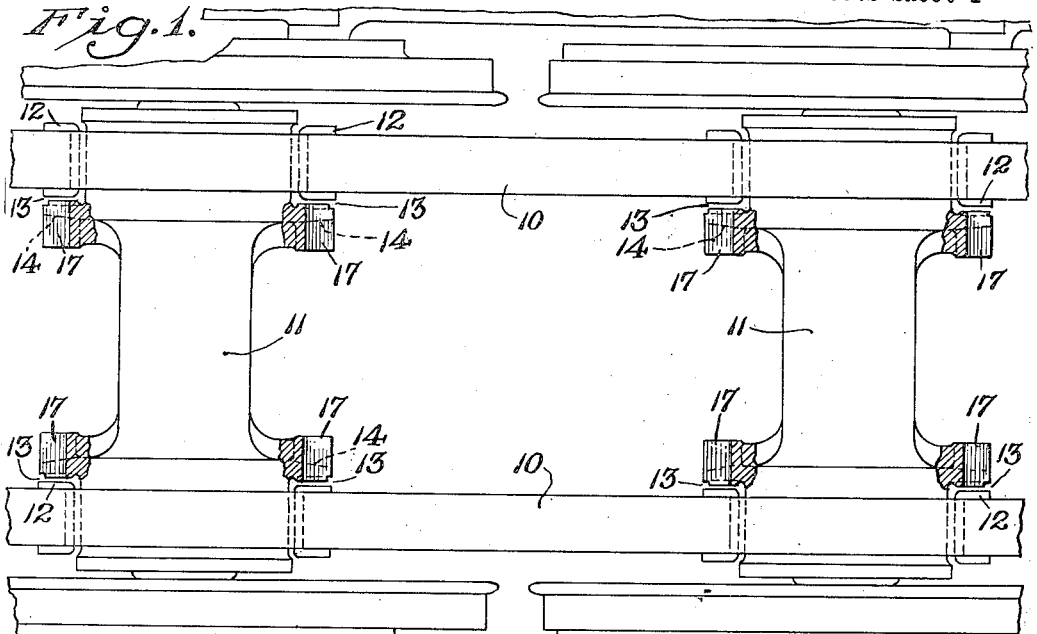
Fig. 1 is a diagrammatic plan view of two sets of driving wheels and the frame of a locomotive indicating the allowable lateral movement.
Figure 2:
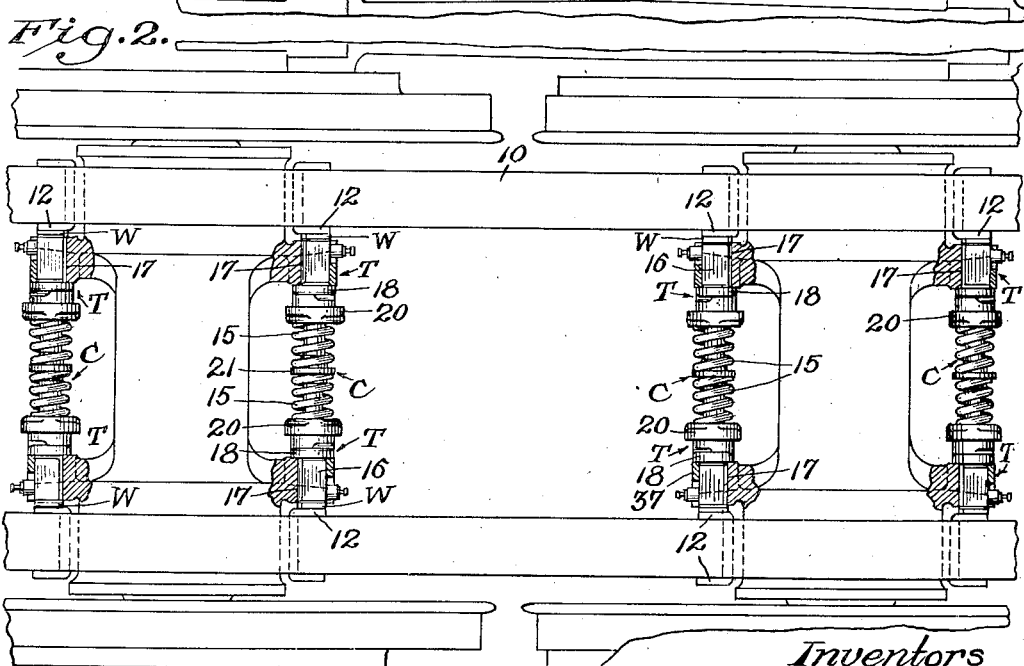
Fig. 2 is a similar view illustrating lateral motion cushioning devices applied to each side of each driving axle.

In these drawings, 10—10 indicates the side portions of the locomotive frame, and 11 the roller bearing housing or axle journal boxes upon which the frame is borne through springs and spring saddles of any suitable construction. They are held in the frame by pedestal jaws, binders, etc., as is customary. The side frames 10 are fitted with generally upright wear pieces of U-shaped construction indicated by 12, and the lateral movement allowable in each instance is indicated at 13 between the inner flange of each shoe 12 and the flange 14 on the roller bearing housing or axle journal box 11. The illustrations in Figs. 1 and 2 are selected merely to indicate the lateral movement allowable and the general relation of parts including the arrangement of the lateral motion cushioning devices, generally indicated by C.

Many details are purposely omitted as matters of choice, and those illustrated in the above patents and Locomotive Cyclopedia may be considered as included herein by reference as illustrations.

The detail of one well known type of roller bearing housing or axle journal box is further illustrated in Buckwalter No. 1,860,702, May 31, 1932.

The lateral motion cushioning devices

The lateral motion cushioning devices generally indicated by C include two thrust elements T cooperating with a spring or springs 15, which in assembly constantly urge them apart but allow them to approach under the forced lateral motion.

Each thrust member T includes a body portion 16, which in use is received within a slot or passageway 17 in the flange 14 of each axle journal box 11. These passageways are in the nature of rectangular slots cut horizontally through the flanges 14 of each side of the journal box. Adjacent to the inner end of each body portion 16 of each thrust member is a collar 18 providing a shoulder 19 to rest against the inner side of each flange 14. Spaced from the collar 18 is an inner collar 20 bored out at 20a to provide a seat for the adjacent end of the spring 15, the opposite ends of which are seated on the intermediately located flanged ring or collar 21.

On the same axis as the spring seats 20a there is a bore 22 in each of the thrust members to receive what has heretofore sometimes been called a spacing bar 23, which will be observed is shorter than the normal distance between the inner ends of the bores 22.

Each thrust member T corresponds quite generally to prior thrust members, but it has been foreshortened and bored at 24 to provide a generally cylindrical bearing opening toward the adjacent side frame on which it is to be used and forming a socket to receive a cylindrical bearing element 25 on a wear shoe generally indicated by W, which includes, in addition to the bearing element 25, a neck portion 26 connecting the bearing portion with a broad wear head 27 presenting an extended flat face 28 for wearing contact and sliding relation with the inner flange of the corresponding shoe 12 on the side frame.

In the form that has proved most satisfactory in practice, the wear shoes W are made of brass, while the thrust elements are made of steel, and, in order to confine the wear to the brass shoe, the socket 24 is fitted with a hardened steel liner 28a, generally cylindrical in form and made fast within the socket by welding at 29. The neck 26, it will be noted, is sufficiently small to allow necessary movement of the wear shoe without binding against the ends of the liner 28.

Each wear shoe W is provided with a tubular projection 30, which has a horizontal lubricant bore 31 extending lengthwise to the locomotive in use and communicating with a horizontal bore 32, one end of which opens onto the wearing surface of the liner 28a and the other end of which opens into X-shaped grooves 33 in the wearing face 28 of the head 27. This device is threaded at 34 to receive an Alemite fitting or the like for supplying grease or other lubricant.

Each of the collars 20 of the thrust members T is provided with a slot 36 (see Fig. 3) to receive the pull-together bolts by which the lateral motion cushioning devices are held assembled and in a state of compression to facilitate placing them as a whole in the slots or passageways 17 in the flanges 14 in the operation of applying the devices to a locomotive. After being emplaced, the pull-together bolts are removed, not to be used again until the devices are to be removed, when they will again be applied in order to make the removal operation safe and easy.

Each lateral motion cushioning device is held in place by a pair of retainers 37 made fast to the corresponding flange 14 by cap screws 38, and each retainer has a slot 40 to provide clearance for the tubular portion 30 and any fitting that may be attached to it.

*Operation*

On tangent or straight track, the springs 15 exert outward pressure on the thrust members and hold the shoulders 19 against the inner faces of the flanges 14 on the axle journal boxes 11. When entering a curve, the wheel flange against the outer rail moves inwardly, carrying with it the axle and the axle journal box. The adjacent flange 14 is thus forced against the shoulder 19 and moves the thrust member T to compress the springs 15 and push the opposite thrust member T with its wear shoe W against the inner flange of the wear shoe 12 on the opposite side frame. The greater the lateral movement, the higher the compression of the springs, and the greater the pressure between the wear shoe W and the flange of the shoe 12, but the lateral shock is cushioned by the springs.

On leaving the curve and entering straight track, the springs will return the box and associated parts to normal centralized position.

The lateral motion is almost invariably accompanied by a rocking motion due to uneven spring action, which has the effect of moving one of each pair of drivers vertically with respect to the frame more than the other. The hinge connection between the wear shoes W and the thrust members T readily accommodates this movement in degree and kind and maintains the broad, well lubricated wearing surfaces 28 against the corresponding inner flange of the shoe 12 on the side frame against which the lateral motion produces the thrust. Throughout the lateral motion and the recovery, the thrust parts are kept with their wear surfaces in position to take the motion with the least amount of damage to the surfaces. The lubricating arrangement illustrated will provide ample lubrication.

The use of a relatively soft metal, like brass, for the wear shoes W in connection with the hardened steel liners 28 will confine the wear for the most part to the shoes, especially if the inner flanges of the shoes 20 are provided with hardened steel liners corresponding to those illustrated at 28. This means that restoration for wear, when that has accumulated a sufficient amount, can be readily made and cheaply made by withdrawing each lateral motion cushioning device and replacing the two wear shoes W with new ones.

Prior lateral motion devices have failed to provide proper support for the spacing bar 23, springs 15, and ring collar 21 with the result that there has been damaging wear and misalignment. To overcome that difficulty and provide accurate, smooth alignment, one of the thrust members T, that indicated on the left in Fig. 5, has been fitted with a seamless tubing 44, fitted tightly within the bore 22 and made fast by welding at 45. The spacing bar 23 fits tight in the bore 22 of the thrust member at the right and has a sliding fit in the tubing 44, which also has a sliding fit in the spring collar 21. The thrust member T, as provided at the right in Fig. 5, has a short piece of tubing 46 welded to it at 47 and telescoping over the adjacent end of the tube 44 with a sliding fit. The spacing bar 23 is secured to the thrust member with a weld 47a.

This arrangement provides accurate alignment for the parts and proper support while allowing all the necessary movement with a minimum of wear.

As an example of a satisfactory construction for a locomotive to provide $\tfrac{5}{16}$" lateral motion each way, the lateral motion cushioning devices are each $31\tfrac{11}{16}$" between the surfaces 28 of the wear shoe. The distance from each surface 28 and the corresponding shoulder 19 is $4^{31}/_{32}$". The rod 23 is $1\tfrac{1}{8}$" in diameter by $19\tfrac{1}{4}$" long. The overall length of each thrust member T, including its wear shoe W, is $9\tfrac{1}{2}$". The cylindrical bearing 25 is $1\tfrac{5}{8}$" in radius. The wearing surface 28 is 5" long and $2\tfrac{1}{2}$" wide.

We claim:

1. In a lateral motion cushioning device for railway vehicles to act between the vehicle frame and its axle journal box, a thrust element, means mounting the thrust element on the journal box for yielding inward movement and a wear shoe pivoted about a horizontal axis to the thrust element whereby it may swing vertically to accommodate rocking movement between the axle and the frame while maintaining broad contact with the frame.

2. In a lateral motion cushioning device for railway vehicles to act between the vehicle frame and its axle journal box, a thrust element, means mounting the thrust element on the journal box for yielding inward movement, and a wear shoe pivoted about a horizontal axis to the thrust member by a cylindrical bearing and socket whereby it may swing vertically to accommodate rocking movement between the axle and the frame while maintaining broad contact with the frame.

3. In a lateral motion cushioning device for railway vehicles to act between the vehicle frame and its axle journal box, a thrust element of relatively hard material, means mounting the thrust element on the journal box for yielding inward movement, and a wear shoe of relatively soft material pivoted about a horizontal axis to the thrust element whereby it may swing vertically to accommodate rocking movement between the axle and the frame while maintaining broad contact with the frame.

4. In a lateral motion cushioning device for railway vehicles to act between the vehicle frame and its axle journal box, a thrust member having a cylindrical socket open at one side of the axis thereof, and a wear shoe having a cylindrical pivot in said socket with a neck extending through the side opening of the socket and a broad head on the neck.

5. In a lateral motion cushioning device for railway vehicles to act between the vehicle frame and its axle journal box, a thrust member having a cylindrical socket open at one side of the axis thereof, a wear shoe having a cylindrical pivot in said socket with a neck extending through the side opening of the socket and a broad head on the neck, and a hard metal liner for said cylindrical socket.

HARRY G. MILLER.
OSCAR C. PETERSON.

REFERENCES CITED

The following references are of record in the file of this patent:

UNITED STATES PATENTS

| Number | Name | Date |
|---|---|---|
| 644,071 | Gummi | Feb. 27, 1900 |
| 1,353,489 | Palmgren | Sept. 21, 1920 |
| 1,946,893 | Blunt | Feb. 13, 1934 |
| 1,982,897 | Bergert | Dec. 4, 1934 |
| 2,020,756 | Woodard | Nov. 12, 1935 |
| 2,047,666 | Blunt | July 14, 1936 |
| 2,047,725 | Brunner | July 14, 1936 |
| 2,276,230 | Eastburg | Mar. 10, 1942 |
| 2,392,616 | Silversparre | Jan. 8, 1946 |